United States Patent
See et al.

(10) Patent No.: US 9,392,558 B2
(45) Date of Patent: Jul. 12, 2016

(54) CONTROL OF TRANSMIT POWER AND ADJUSTMENT OF ANTENNA TUNING NETWORK OF A WIRELESS DEVICE

(71) Applicant: QUALCOMM Incorporated, San Diego, CA (US)

(72) Inventors: Puay Hoe See, San Diego, CA (US); Xiangdong Zhang, Westford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 13/667,160

(22) Filed: Nov. 2, 2012

(65) Prior Publication Data
US 2013/0331042 A1    Dec. 12, 2013

Related U.S. Application Data

(60) Provisional application No. 61/657,390, filed on Jun. 8, 2012.

(51) Int. Cl.
*H04B 1/40* (2015.01)
*H04W 52/36* (2009.01)
*H04B 17/12* (2015.01)

(52) U.S. Cl.
CPC ............. *H04W 52/367* (2013.01); *H04B 17/12* (2015.01)

(58) Field of Classification Search
CPC ......... H04B 1/40; H04B 1/3822; H04B 1/406
USPC .......................................................... 455/77
See application file for complete search history.

(56) References Cited

U.S. PATENT DOCUMENTS

| | | | | |
|---|---|---|---|---|
| 6,121,925 A | * | 9/2000 | Hilliard | H01Q 21/0025 342/374 |
| 6,704,352 B1 | * | 3/2004 | Johnson | H04B 17/20 343/822 |
| 7,356,309 B2 | * | 4/2008 | Fifield | H04B 1/0475 324/95 |
| 8,125,399 B2 | * | 2/2012 | McKinzie | H01Q 9/0407 343/746 |

(Continued)

FOREIGN PATENT DOCUMENTS

WO    9943096 A1    8/1999

OTHER PUBLICATIONS de Jongh, et al., "Mobile Phone Performance Improvements using an Adaptively Controlled Antenna Tuner," IEEE, 978-1-61284-757-3/11, year 2011, 4pgs.

(Continued)

*Primary Examiner* — April G Gonzales
(74) *Attorney, Agent, or Firm* — Linda G. Gunderson

(57) ABSTRACT

Techniques for controlling transmit power and adjusting an antenna tuning network of a wireless device are disclosed. In an exemplary design, an apparatus (e.g., a wireless device or a circuit module) includes a directional coupler and at least one detector. The directional coupler receives an input radio frequency (RF) signal at a first port, provides an output RF signal at a second port, and provides a coupled RF signal at a third port. The detector(s) receive at least one RF signal on at least one port of the directional coupler, measure the at least one RF signal, and provide measurements that are used to control the transmit power of the wireless device and adjust an antenna tuning network. For example, the measurements may be used to determine incident power, reflected power, delivered power, etc., which may be used to control the transmit power and/or adjust the antenna tuning network.

11 Claims, 11 Drawing Sheets

(56) References Cited

U.S. PATENT DOCUMENTS

| | | | | |
|---|---|---|---|---|
| 8,204,446 B2* | 6/2012 | Scheer | H01Q 1/242 | 455/129 |
| 8,594,584 B2* | 11/2013 | Greene | H04B 1/0458 | 333/17.3 |
| 8,626,083 B2* | 1/2014 | Greene | H01Q 5/314 | 315/151 |
| 2004/0152431 A1* | 8/2004 | Johnson | H04B 17/20 | 455/130 |
| 2007/0184793 A1* | 8/2007 | Drogi | H03F 1/0205 | 455/127.1 |
| 2007/0213006 A1* | 9/2007 | Wong | H04W 52/367 | 455/13.4 |
| 2009/0253385 A1* | 10/2009 | Dent | H04B 1/0458 | 455/83 |
| 2010/0001810 A1* | 1/2010 | Charley | H01P 5/18 | 333/109 |
| 2010/0036369 A1* | 2/2010 | Hancock | A61N 5/04 | 606/33 |
| 2010/0217553 A1* | 8/2010 | Von Novak | H04B 5/0056 | 702/65 |
| 2011/0117973 A1* | 5/2011 | Asrani | H04W 52/245 | 455/571 |
| 2012/0112852 A1* | 5/2012 | Manssen | H03H 7/40 | 333/105 |
| 2012/0170632 A1* | 7/2012 | Walker | H04B 17/10 | 375/224 |
| 2012/0295554 A1* | 11/2012 | Greene | H04B 1/0458 | 455/77 |
| 2012/0295555 A1* | 11/2012 | Greene | H01Q 5/314 | 455/77 |
| 2013/0225088 A1* | 8/2013 | Anderson | H04B 1/18 | 455/62 |

OTHER PUBLICATIONS

International Search Report and Written Opinion—PCT/US2013/044813—ISA/EPO—Jul. 26, 2013.

Sankey, et al., "Adaptive Tuning for Handheld Transmitters", University of Colorado at Boulder, IEEE 10.1109/MWSYM.2009.5165673, 2009, pp. 225-228.

Song, et al., "A Mixed-Signal Matching State Search Based Adaptive Antenna Tuning IC", IEEE Microwave and Wireless Components Letters, vol. 20, No. 10, Oct. 2010, pp. 581-583.

* cited by examiner

CONTROL OF TRANSMIT POWER AND ADJUSTMENT OF ANTENNA TUNING NETWORK OF A WIRELESS DEVICE

CLAIM OF PRIORITY UNDER 35 U.S.C. §119

The present application for patent claims priority to Provisional U.S. Application Ser. No. 61/657,390, entitled "CONTROL OF TRANSMIT POWER AND ANTENNA TUNING NETWORK OF A WIRELESS DEVICE," filed Jun. 8, 2012, assigned to the assignee hereof, and expressly incorporated herein by reference.

BACKGROUND

I. Field

The present disclosure relates generally to electronics, and more specifically to techniques for controlling operation of a wireless device.

II. Background

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a radio frequency (RF) carrier signal with data to obtain a modulated signal, amplify the modulated signal to obtain an output RF signal having the proper output power level, and transmit the output RF signal via an antenna to a base station. For data reception, the receiver may obtain a received RF signal via the antenna and may condition and process the received RF signal to recover data sent by the base station.

The transmitter may include various circuits such as a power amplifier (PA), a filter, etc. The receiver may also include various circuits such as a low noise amplifier (LNA), a filter, etc. An antenna tuning network may be coupled between the antenna and the transmitter and/or the receiver and may perform power and/or impedance matching for the antenna. The antenna tuning network may have a large impact on the performance of the wireless device. It may be desirable to control the operation of circuits on the wireless device such that good performance can be achieved.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Techniques for controlling transmit power and adjusting an antenna tuning network of a wireless device are disclosed herein. These techniques may be used for various types of wireless devices.

Figure 1:
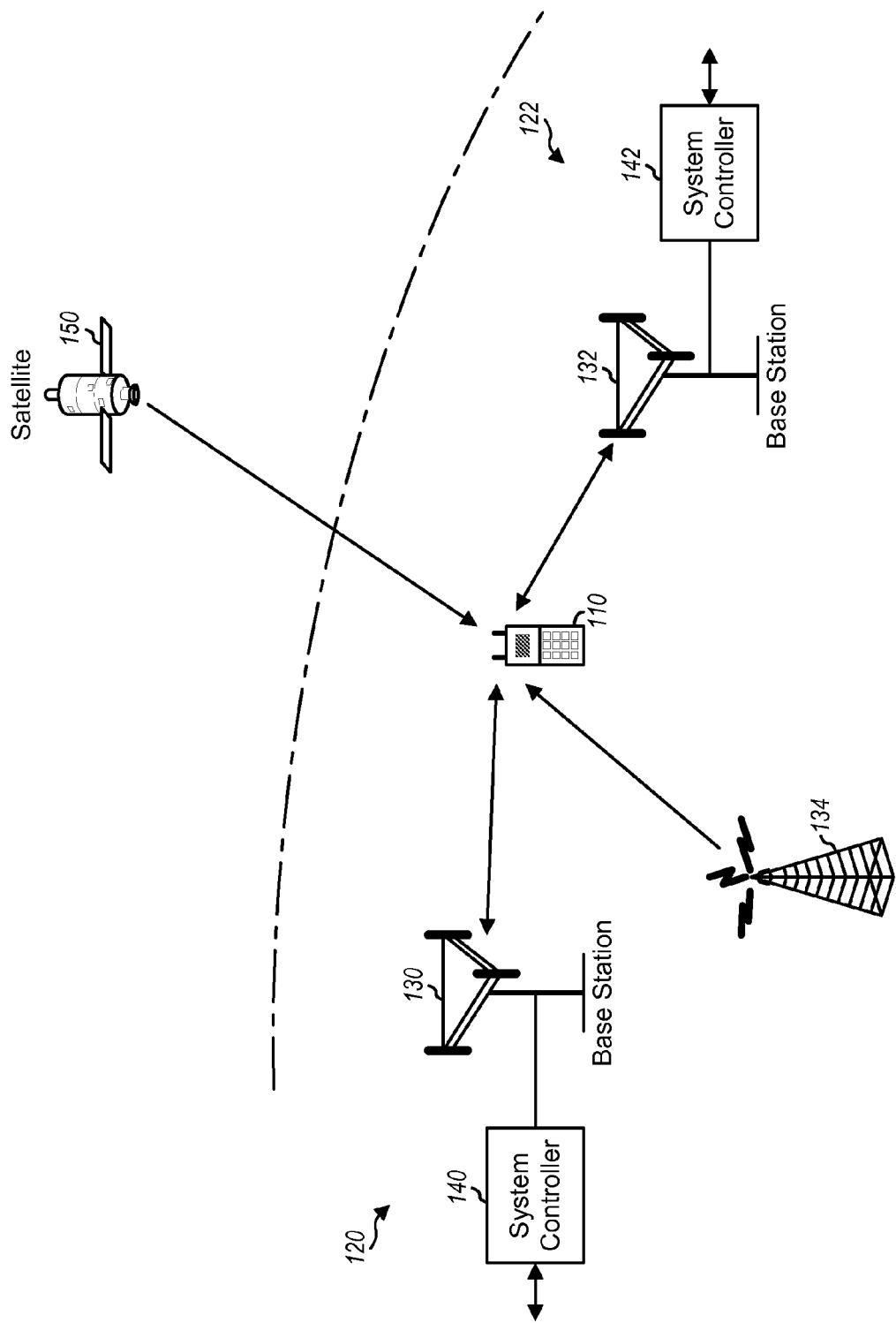
FIG. 1 shows a wireless device capable of communicating with different wireless communication systems.

FIG. 1 shows a wireless device 110 capable of communicating with different wireless communication systems 120 and 122. Wireless systems 120 and 122 may each be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Time Division Synchronous CDMA (TD-SCDMA), or some other version of CDMA. For simplicity, FIG. 1 shows wireless system 120 including one base station 130 and one system controller 140, and wireless system 122 including one base station 132 and one system controller 142. In general, each wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, a consumer electronic device, etc. Wireless device 110 may be capable of communicating with wireless system 120 and/or 122. Wireless device 110 may also be capable of receiving signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1x, TD-SCDMA, GSM, IEEE 802.11, Bluetooth, etc.

Wireless device 110 may support frequency division duplexing (FDD) and/or time division duplexing (TDD). For TDD, the downlink and uplink share the same frequency, and downlink transmissions and uplink transmissions may be sent on the same frequency in different time periods. For FDD, the downlink and uplink are allocated separate frequencies. Downlink transmissions may be sent on one frequency, and uplink transmissions may be sent on another frequency. Some exemplary radio technologies supporting TDD include LTE TDD, TD-SCDMA, and GSM. Some exemplary radio technologies supporting FDD include LTE FDD, WCDMA, and CDMA 1x.

Figure 2:
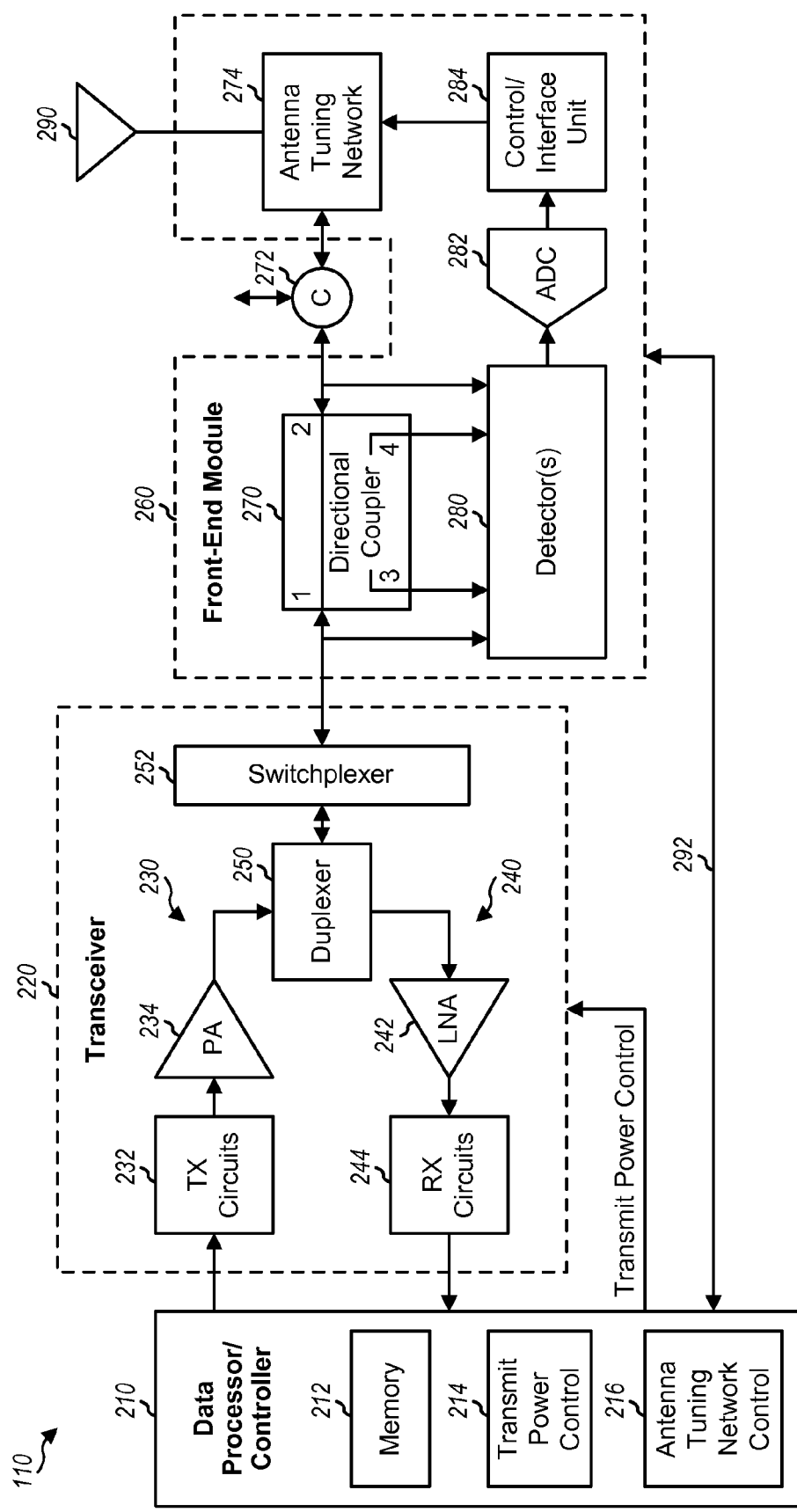
FIG. 2 shows a block diagram of the wireless device in FIG. 1.

FIG. 2 shows a block diagram of an exemplary design of wireless device 110 in FIG. 1. In this exemplary design, wireless device 110 includes a data processor/controller 210, a transceiver 220, a front-end module 260, and an antenna 290. Data processor/controller 210 may also be referred to as a modem. Transceiver 220 includes a transmitter 230 and a receiver 240 that support bi-directional wireless communication.

In the transmit path, data processor 210 processes (e.g., encodes and modulates) data to be transmitted and provides an analog output signal to transmitter 230. Within transmitter 230, transmit (TX) circuits 232 amplify, filter, and upconvert the analog output signal from baseband to RF and provide a modulated signal. TX circuits 232 may include amplifiers, filters, mixers, an oscillator, a local oscillator (LO) generator, a phase locked loop (PLL), etc. A power amplifier (PA) 234 receives and amplifies the modulated signal and provides an amplified RF signal having the proper output power level. The amplified RF signal is provided to a duplexer 250, which includes a transmit (TX) filter and a receive (RX) filter. The TX filter receives and filters the amplified RF signal to pass signal components in a transmit band and attenuate signal components in a receive band. The TX filter provides a transmit RF signal, which is routed through a switchplexer 252 and provided to front-end module 260.

Within front-end module 260, the transmit RF signal is routed through a directional coupler 270, a connector (C) 272, and an antenna tuning network 274 and transmitted via antenna 290. Directional coupler 270 receives the transmit RF signal via port 1 and passes most of the transmit RF signal through port 2 toward antenna 290. Directional coupler 270 also couples a small portion of the transmit RF signal from port 1 to port 3 and provides a coupled RF signal to detector(s) 280. Directional coupler 270 also receives an RF signal reflected from antenna tuning network 274 at port 2, couples a small portion of this RF signal from port 2 to port 4, and provides a reflected RF signal to detector(s) 280. Connector 272 enables wireless device 110 to interface with an external device such as an external antenna, a test equipment, etc. An external device may be connected to connector 272, antenna tuning network 274 may be disconnected from connector 272, and an output RF signal may be routed from directional coupler 270 to the external device. When no external device is connected to connector 272, the output RF signal may be routed from directional coupler 270 to antenna tuning network 274. Antenna tuning network 274 performs impedance and/or power matching for antenna 290 and may also be referred to a matching circuit, a tunable matching circuit, as an antenna tuning circuit, etc.

In the receive path, antenna 290 receives signals from base stations and/or other transmitter stations and provides a received RF signal. The received RF signal is routed through antenna tuning network 274, connector 272, and directional coupler 270 and provided to transceiver 220.

Within transceiver 220, the received RF signal is routed through switchplexer 252 and provided to duplexer 250. The RX filter within duplexer 250 filters the received RF signal to pass signal components in the receive band and attenuate signal components in the transmit band. The RX filter provides an LNA input signal to an LNA 242. LNA 242 amplifies the LNA input signal and provides an LNA output signal. RX circuits 244 downconvert the LNA output signal from RF to baseband, amplify and filter the downconverted signal, and provide an analog input signal to data processor 210. RX circuits 244 may include amplifiers, filters, mixers, an oscillator, an LO generator, a PLL, etc.

FIG. 2 shows an exemplary design of transmitter 230 and receiver 240. Transmitter 230 and/or receiver 240 may include different and/or additional circuits not shown in FIG. 2. For example, transmitter 230 may include a driver amplifier prior to PA 234, a matching circuit after PA 234, etc.

FIG. 2 shows an exemplary design of wireless device 110 with one transmitter 230 and one receiver 240 for one antenna 290. In general, a wireless device may include any number of transmitters and any number of receivers for any number of antennas, any number of frequency bands, and any number of radio technologies. Each transmitter and each receiver may support operation on one or multiple frequency bands. Switchplexer 252 may be coupled (directly or indirectly) to other transmitters and/or receivers.

Wireless device 110 may support FDD and/or TDD. A transmitter and a receiver for FDD may be coupled to a duplexer (e.g., as shown in FIG. 2). The duplexer may simultaneously (i) route a transmit RF signal from a PA within the transmitter to an antenna and (ii) route a received RF signal from the antenna to an LNA within the receiver. A transmitter and a receiver for TDD may be coupled to a switchplexer (not shown in FIG. 2). The switchplexer may (i) couple the transmitter to the antenna during time intervals designated for uplink transmission and (ii) couple the receiver to the antenna during time intervals designated for downlink transmission.

Detector(s) 280 may include one or more detectors, e.g., one or more power detectors, voltage detectors, current detectors, square-law detectors, phase detectors, and/or other types of detectors. Detector(s) 280 may receive RF signals at different ports of directional coupler 270 and may measure the voltage, current, power, and/or other characteristics of the RF signals. An analog-to-digital converter (ADC) 282 may digitize the measurements from detector(s) 280 and provide digitized measurement values. A control/interface unit 284 may receive the measurement values from ADC 282 and may (i) send the measurement values to data processor/controller 210 and/or (ii) adjust antenna tuning network 274 based on the measurement values. Control/interface unit 284 may communicate with data processor/controller 210 via a bus 292 in order to control the operation of wireless device 110, e.g., to control the transmit power of wireless device 110, to adjust antenna tuning network 274, etc. Bus 292 may include one or more signal lines, e.g., at least one signal line from data processor/controller 210 to front-end module 260 and at least one signal line from front-end module 260 to data processor/controller 210.

FIG. 2 shows an exemplary design of front-end module 260. Front-end module 260 may include different and/or additional circuits not shown in FIG. 2. Furthermore, the circuits in transceiver 220 and front-end module 260 may be arranged in a different configuration than the configuration shown in FIG. 2. For example, directional coupler 270 may be located prior to switchplexer 252 instead of after switchplexer 252 as shown in FIG. 2. Detector(s) 280 and/or ADC 282 may be part of transceiver 220 instead of front-end module 260.

All or a portion of transceiver 220 may be implemented on one or more analog integrated circuits (ICs), RF ICs (RFICs), mixed-signal ICs, etc. For example, transmit circuits 232, PA 234, LNA 242, and receive circuits 244 may be implemented on an RFIC. PA 234 and possibly other circuits may also be implemented on a separate IC or circuit module. Front-end module 260 may be implemented on a separate IC or circuit module. Transceiver 220 and front-end module 260 may also be implemented on the same IC or circuit module or implemented in other manners.

Data processor/controller 210 may perform various functions for wireless device 110. For example, data processor 210 may perform processing for data being transmitted via transmitter 230 and data being received via receiver 240. Controller 210 may control the operation of transmit circuits 232, PA 234, LNA 242, receive circuits 244, and/or switchplexer 252 within transceiver 220. Controller 210 may also control the operation of detector(s) 280, control/interface unit 284, antenna tuning network 274, and/or other modules within front-end module 260. Memory 212 may store program codes and data for data processor/controller 210. Memory 212 may be internal to data processor/controller 210 (as shown in FIG. 2) or external to data processor/controller 210 (not shown in FIG. 2). A module 214 may control the transmit power of wireless device 110, as described below. A module 216 may adjust antenna tuning network 274 to obtain good performance, as also described below. Modules 214 and 216 may be separate modules, as shown in FIG. 2. Modules 214 and 216 may also be combined into one module. Each module may be implemented in hardware, software, or a combination of both. Data processor/controller 210 may be implemented on one or more application specific integrated circuits (ASICs) and/or other ICs.

In an aspect of the present disclosure, a single/common set of directional coupler and detector(s) (e.g., directional coupler 270 and detector(s) 280 in FIG. 2) may be used for multiple functions such as controlling the transmit power of a wireless device, adjusting an antenna tuning network within the wireless device, etc. This may enable the wireless device to support more functionality with fewer circuits, which may reduce cost, reduce circuit area, improve performance, etc.

Figure 3:
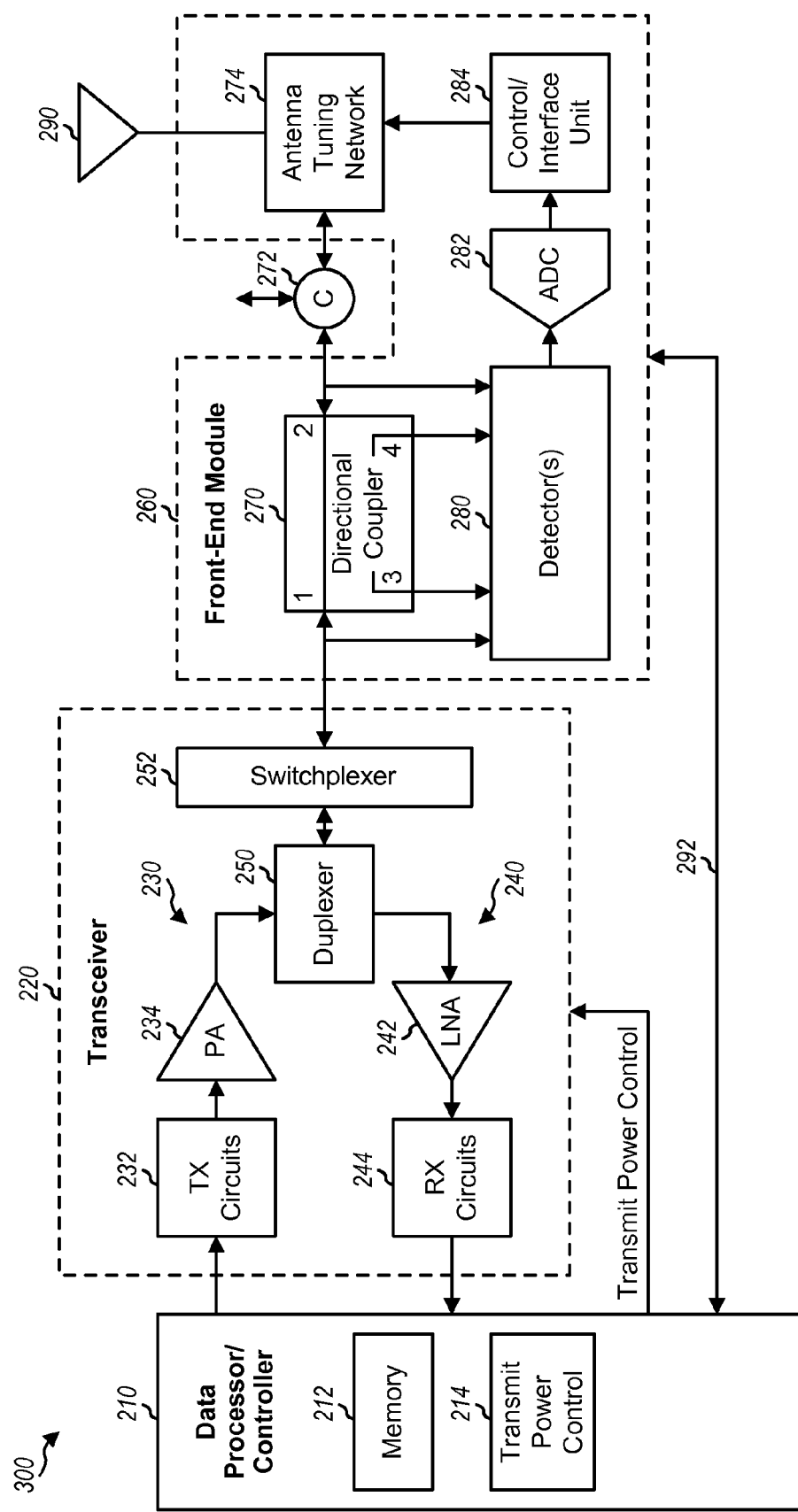
FIG. 3 shows a configuration of the wireless device for controlling transmit power of the wireless device.

FIG. 3 shows an exemplary configuration 300 of wireless device 110 in FIG. 2 for controlling the transmit power of wireless device 110. Transmit power control may include maximum transmit power control, closed-loop transmit power control, and/or other types of transmit power control. Maximum transmit power control refers to control of a maximum transmit power of wireless device 110. Closed-loop transmit power control refers to control of a transmit power of wireless device 110 in a closed loop to obtain a desired transmit power for wireless device 110.

In configuration 300, detector(s) 280 may receive at least one RF signal on at least one port of directional coupler 270 and may determine the power level of each RF signal. Detector(s) 280 may include a power detector that detects the power level of each RF signal. ADC 282 may digitize the detected power level of each RF signal and may provide the digitized detected power level to interface unit 284. Interface unit 284 may send the detected power level of each RF signal via bus 292 to transmit power control module 214 within data processor/controller 210.

Module 214 may determine the current/present transmit power of wireless device 110 based on the detected power level of each RF signal. Module 214 may determine the current transmit power by accounting for various factors such as a coupling factor between different ports (e.g., from port 1 to port 3) of directional coupler 270, the gain of the power detector used for power detection, the gain of ADC 282, variations in the detected power level versus temperature and power supply voltage, and/or other factors. Module 214 may determine a target transmit power of wireless device 110, which may be provided by controller 210. The target transmit power may correspond to a maximum transmit power allowed for wireless device 110 or a desired transmit power determined by closed-loop power control. The maximum transmit power may be dependent on various factors such as (i) the maximum transmit power allowed by a wireless system with which wireless device 110 communicates, (ii) the maximum transmit power configured for wireless device 110 due to data requirements, interference, and/or other considerations, and/or (iii) other factors. Module 214 may determine whether the current transmit power of wireless device 110 exceeds the target transmit power of wireless device 110. Module 214 may (i) reduce the transmit power of wireless device 110 if the current transmit power exceeds the target transmit power or (ii) increase the transmit power of wireless device 110 if the current transmit power is less than the target transmit power. Module 214 may then send a transmit power control to transceiver 220. The transmit power control may adjust the gain of an amplifier within transmit circuits 232 and/or adjust the gain of PA 234 in order to adjust the transmit power of wireless device 110 to be at or close to the target transmit power of wireless device 110.

In an exemplary design, transmit power control may be performed as follows. Detector(s) 280 may measure (i) incident power at port 1 of directional coupler 270 and (ii) reflected power at port 4 of directional coupler 270, as described below. Delivered power to antenna tuning network 274 may then be determined as the difference between the incident power and the reflected power. The incident power, the reflected power, and the delivered power may be given in units of decibel relative to 1 milliwatt (dBm). The delivered power may be compared against a target transmit power (e.g., a target maximum transmit power), and the difference may be filtered to obtain a power error. The power error may be used to adjust the transmit power (e.g., the maximum transmit power) of wireless device 110.

Figure 4:
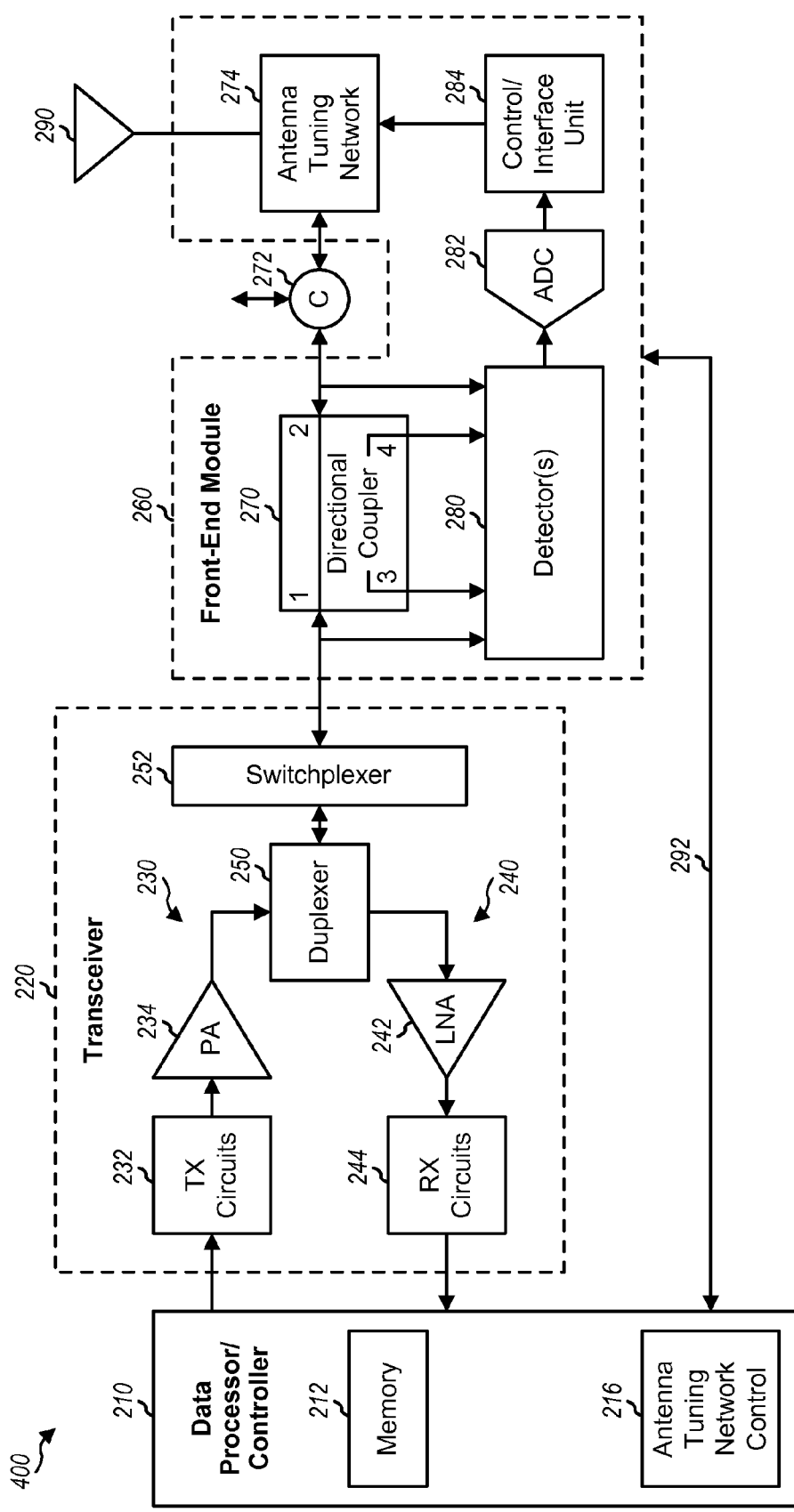
FIG. 4 shows a configuration of the wireless device for adjusting an antenna tuning network within the wireless device.

FIG. 4 shows an exemplary configuration 400 of wireless device 110 in FIG. 2 for adjusting antenna tuning network 274. In configuration 400, detector(s) 280 may receive an input RF signal at port 1 of directional coupler 270, an output RF signal at port 2 of directional coupler 270, a coupled RF signal at port 3 of directional coupler 270, and/or a reflected RF signal at port 4 of directional coupler 270. Detector(s) 280 may measure the power, voltage, current, and/or other characteristics of at least one RF signal among the four RF signals on the four ports of directional coupler 270. ADC 282 may digitize the measurements from detector(s) 280 and may provide measurement values.

In an exemplary design, the measurement values from ADC 282 may be sent to antenna tuning network control module 216 within data processor/controller 210. Module 216 may adjust antenna tuning network 274 to achieve good performance for data transmission and reception. In this exemplary design, control/interface unit 284 may send the measurement values via bus 292 to module 216. Module 216 may determine pertinent parameters (e.g., the delivered power and/or the impedance of the load formed by a combination of antenna tuning network 274 and antenna 290) based on the measurement values and/or other inputs. The other inputs may comprise the outputs of contextual sensors, the current of PA 234, a selected frequency band/channel and/or a selected mode (e.g., from data processor/controller 210), and/or other inputs. Module 216 may also receive performance characterizations of different possible settings of antenna tuning network 274, which may be determined a priori and stored in a look-up table (not shown in FIG. 2 or 4). The performance characterizations may be determined during design phase, manufacturing, and/or field operation based on measurements, computer simulation, etc. Module 216 may generate a tuner control to adjust antenna tuning network 274 to achieve good performance, e.g., to obtain higher delivered power to antenna 290. Module 216 may send the tuner control via serial bus 292 to control/interface unit 284. Unit 284 may generate appropriate controls for antenna tuning network 274 based on the tuner control.

In another exemplary design, the measurement values from ADC 282 may be used by control/interface unit 284 to directly adjust antenna tuning network 274 to achieve good performance. In this exemplary design, unit 284 may determine pertinent parameters (e.g., delivered power and/or load impedance) based on the measurement values from ADC 282 and/or other inputs. Unit 284 may generate appropriate controls for antenna tuning network 274 based on the determined parameters and performance characterizations of different possible settings of antenna tuning network 274, which may be stored in a look-up table (not shown in FIG. 2 or 4). Unit 284 may provide the controls to antenna tuning network 274.

FIGS. 3 and 4 show exemplary configurations of wireless device 110 for controlling the transmit power of wireless device 110 and adjusting antenna tuning network 274. Directional coupler 270 and detector(s) 280 may also be used for other functions.

Figure 5:
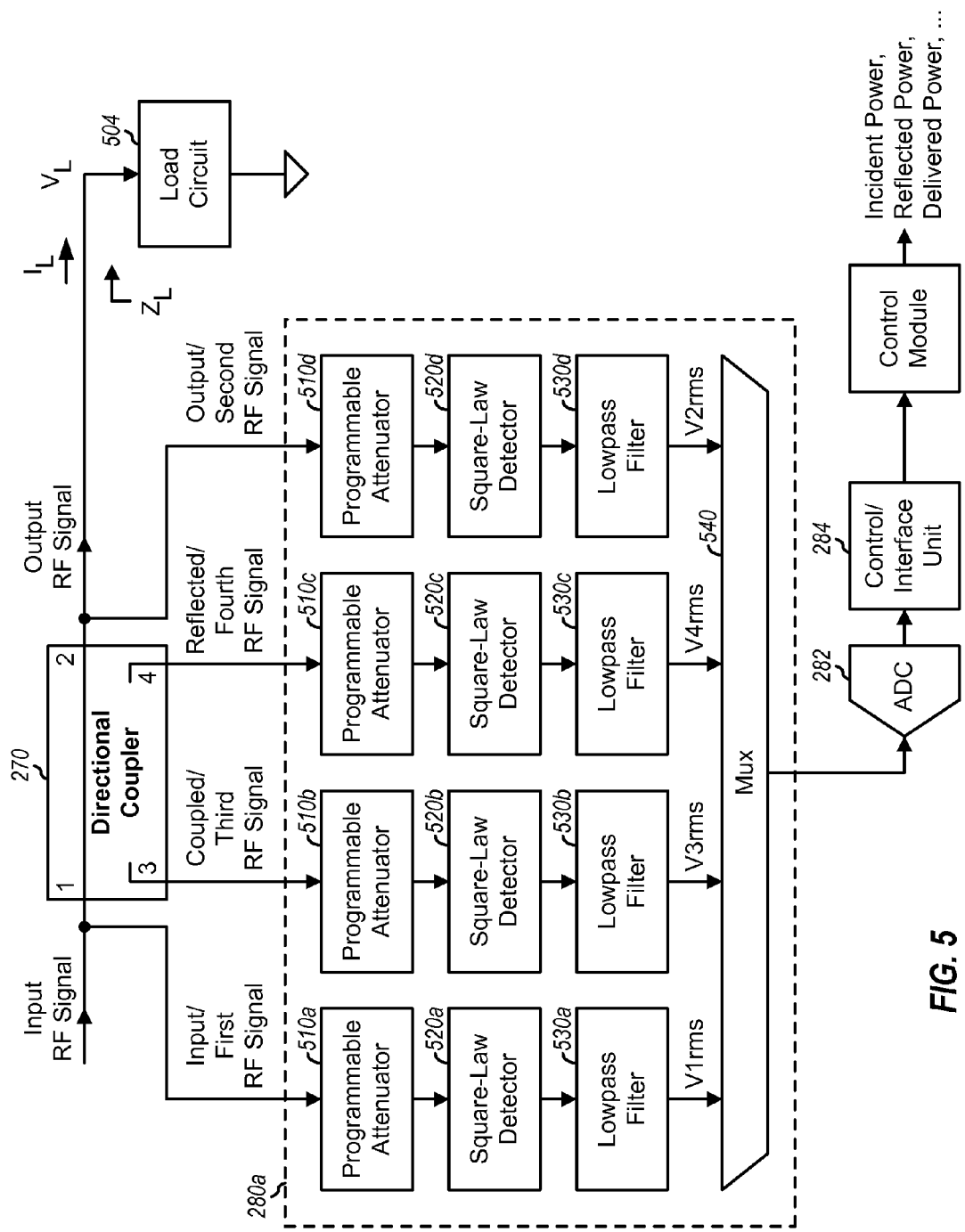
FIGS. 5 to 7 show three exemplary designs of detector(s) within the wireless device.

FIG. 5 shows a block diagram of detector(s) 280a, which is one exemplary design of detector(s) 280 in FIG. 2. In the exemplary design shown in FIG. 5, detector(s) 280a include four inputs that receive four RF signals—a first RF signal corresponding to the input RF signal at port 1 of directional coupler 270, a second RF signal corresponding to the output RF signal at port 2 of directional coupler 270, a third RF signal corresponding to the coupled RF signal at port 3 of directional coupler 270, and a fourth RF signal corresponding to the reflected RF signal at port 4 of directional coupler 270.

In the exemplary design shown in FIG. 5, detector(s) 280a includes a programmable attenuator 510, a square-law detector 520, and a lowpass filter 530 for each of the four RF signals. The first RF signal is provided to programmable attenuator 510a, which attenuates the first RF signal by an appropriate amount in order to avoid clipping of subsequent circuits. The amount of attenuation may be dependent on the power level of the first RF signal. Square-law detector 520a detects the power of the attenuated first RF signal from attenuator 510a. Lowpass filter 530a filters the detected power of the attenuated first RF signal and provides measured power for the first RF signal. The second, third and fourth RF signals may be processed in similar manner as the first RF signal. In the exemplary design shown in FIG. 5, a multiplexer (Mux) 540 receives the measured powers for the four RF signals and provides the measured power for one RF signal at a time to ADC 282. In another exemplary design, the measured powers V1rms to V4rms for the four RF signals may be provided to four ADCs, and each ADC may digitize the measured power for one RF signal. In any case, measurement values corresponding to the digitized measured powers for the four RF signals may be provided to control/interface unit 284, which may send the measurement values to a control module (e.g., module 214 and/or 216 in FIG. 2).

In an exemplary design, the measurement values may be used to compute one or more of the following parameters:

$$P_{incident} = \frac{C_f}{50} \cdot (V_{3rms}^2 - 2D_f \cdot \cos(\phi - \theta) \cdot V_{3rms} \cdot V_{4rms} + D_f^2 \cdot V_{4rms}^2), \quad \text{Eq (1)}$$

$$P_{reflected} = \frac{C_r}{50} \cdot (V_{4rms}^2 - D_r \cdot (V_{2rms}^2 - V_{incrms}^2 - V_{4rms}^2) + D_r^2 \cdot V_{3rms}^2), \quad \text{Eq (2)}$$

$$P_{delivered} = P_{incident} - P_{reflected}, \quad \text{Eq (3)}$$

$$\Gamma_{load} = \sqrt{\frac{P_{reflected}}{P_{incident}}} \cdot e^{j\phi \cdot sign}, \quad \text{Eq (4)}$$

$$\phi = \arccos\left(\frac{V_{2rms}^2 - V_{3rms}^2 - V_{4rms}^2}{2V_{3rms} \cdot V_{4rms}}\right), \quad \text{Eq (5)}$$

$$sign \approx \frac{|V_{1rms} - V_{2rms}|}{V_{1rms} - V_{2rms}}, \quad \text{Eq (6)}$$

$$D_f \cdot e^{j\theta} = \frac{S_{32}}{S_{31}}, \quad \text{Eq (7)}$$

$$D_r = \left|\frac{S_{41}}{S_{42}}\right|, \quad \text{Eq (8)}$$

where $C_f$ is a forward coupling factor from port 1 to port 3 of directional coupler 270, $C_r$ is a reverse coupling factor from port 2 to port 4 of directional coupler 270, $D_f$ and $D_r$ are forward and reverse directivity, respectively, $S_{ij}$ is a ratio of the power at port i to the power at port j of directional coupler 270, $V_{1rms}$, $V_{2rms}$, $V_{3rms}$ and $V_{4rms}$ are measured power of the first, second, third and fourth RF signals, respectively, $P_{incident}$ is the incident power at port 1 of directional coupler 270, $P_{reflected}$ is the reflected power at port 4 of directional coupler 270, $P_{delivered}$ is the delivered power to the load at port 2 of directional coupler 270, $\phi$ is the phase of the load, and $\Gamma_{load}$ is a reflection coefficient for the load.

S parameters S31, S32, S41 and S42 are elements of a 4×4 scattering parameter matrix that characterizes a 4-port network such as directional coupler 270. Each S parameter may be obtained via computer simulation, measurements of the 4-port network, etc.

In an exemplary design, antenna tuning network 274 may be adjusted as follows. Antenna tuning network 274 may be set to an initial circuit setting, which may be selected based on operating characteristics (e.g., the frequency band and/or transmit power level) of wireless device 110. A performance metric may be determined for this initial circuit setting. The performance metric may be defined based on one or more parameters such as delivered power, reflected power, PA current, etc. Antenna tuning network 274 may then be set (e.g., randomly or based on a search algorithm) to a new circuit setting, and a performance metric may be determined for the new circuit setting. The new circuit setting may be retained if the performance metric for the new circuit setting is better than the performance metric for the initial circuit setting. Antenna tuning network 274 may be iteratively adjusted and evaluated in similar manner until the best performance metric is obtained. The best performance metric may correspond to the maximum delivered power, the minimum reflected power, etc.

In another exemplary design, the load impedance at port 2 of directional coupler 270 may be determined based on the delivered power, the reflected power, and the phase of the load. Antenna tuning network 274 may be adjusted in order to reduce the difference between the load impedance and a target impedance.

Antenna tuning network 274 may also be adjusted in other manners. In general, any combination of measurements and any type of measurement from detector(s) 280 may be used to adjust antenna tuning network 274.

Figure 6:
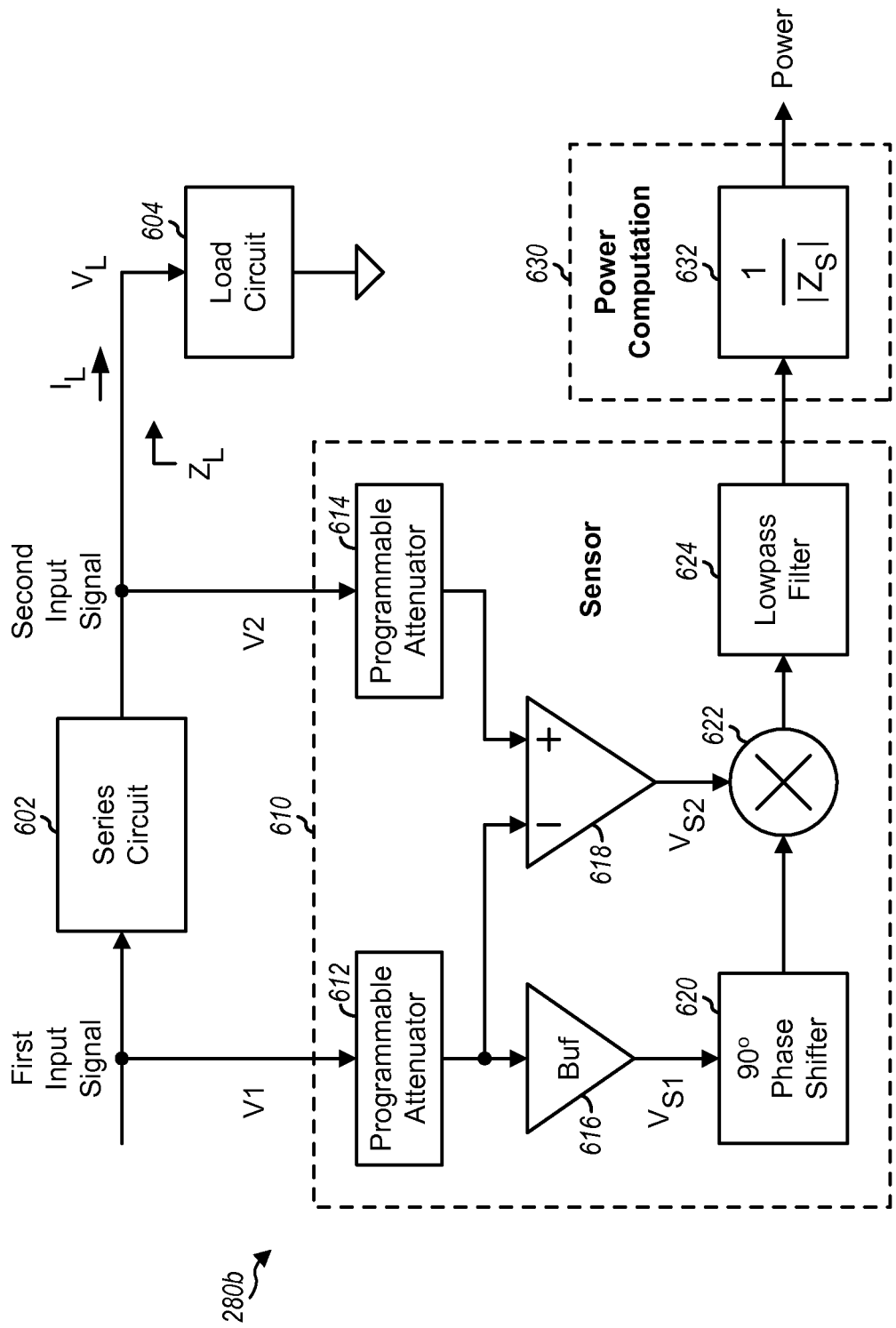

FIG. 6 shows a block diagram of a detector 280b, which is another exemplary design of detector(s) 280 in FIG. 2. Detector 280b may include a sensor 610 and a computation unit 630, as shown in FIG. 6. Alternatively, detector 280b may include only sensor 610, and computation unit 630 may be part of module 214 and/or module 216 within data processor/controller 210 in FIG. 2.

In the exemplary design shown in FIG. 6, sensor 610 includes first and second inputs coupled to an input and an output, respectively, of a series circuit 602. Circuit 602 may correspond to directional coupler 270, antenna tuning network 274, or some other circuit within transceiver 220 or front-end module 260 in wireless device 110. Circuit 602 may have a series impedance of $Z_S$. A load circuit 604 may be coupled to the output of series circuit 602. Load circuit 604 may correspond to antenna tuning network 274, or antenna 290, or some other circuit within wireless device 110, or a combination thereof. In one exemplary design, circuit 602 may correspond to directional coupler 270, and load circuit 604 may correspond to a combination of antenna tuning network 274 and antenna 290.

Within sensor 610, a programmable attenuator 612 receives a first input signal (V1) from the first input and provides a first attenuated signal. A programmable attenuator 614 receives a second input signal (V2) from the second input and provides a second attenuated signal. The first and second input signals may each correspond to the input RF signal at port 1 of directional coupler 270, the output RF signal at port 2 of directional coupler 270, the coupled RF signal from port 3 of directional coupler 270, the reflected RF signal from port 4 of directional coupler 270, or some other RF signal within transceiver 220 or front-end module 260.

Programmable attenuators 612 and 614 may each provide a variable amount of attenuation depending on the transmit power of wireless device 110 in order to reduce the dynamic range of the signals provided to circuits within detector 280b. A buffer (Buf) 616 buffers the first attenuated signal and provides a first sensed signal ($V_{S1}$), which may be a scaled version of the first input signal. A phase shifter 620 shifts the $V_{S1}$ signal by 90° at a frequency of interest and provides a phase-shifted signal. A fixed-gain amplifier 618 receives the first attenuated signal at an inverting input and the second attenuated signal at a non-inverting input and provides a second sensed signal ($V_{S2}$). The $V_{S2}$ signal may be indicative of the voltage drop across series circuit 602. A multiplier 622 multiplies the phase-shifted signal from phase shifter 620 with the $V_{S2}$ signal from amplifier 618 and provides a multiplier output signal. A lowpass filter 624 receives the multiplier output signal, filters out high frequency components, and provides a sensor output ($Y_{OUT}$).

Within computation unit 630, a unit 632 receives and divides the sensor output by the magnitude of series impedance $Z_S$. Unit 632 provides a delivered power ($P_{OUT}$), which may be expressed as:

$$P_{OUT} = V_{S1,PK} \cdot I_{L,PK} \cdot \cos(\theta), \qquad \text{Eq (9)}$$

where
- $V_{S1,PK}$ is a peak voltage of the $V_{S1}$ signal,
- $I_{L,PK}$ is a peak current delivered to the load, and
- $\theta$ is a phase that is dependent on mismatch between antenna tuning network 274 and antenna 290 and may be close to 0 degrees with good matching.

In the exemplary design shown in FIG. 6, the V1 signal is phase shifted and multiplied with the $V_{S2}$ signal. The $P_{OUT}$ power in equation (9) may then be the power delivered to series circuit 602. Series circuit 602 may have a small loss, and most of the $P_{OUT}$ power may be delivered to load circuit 604 (e.g., antenna tuning network 274 and antenna 290).

In another exemplary design that is not shown in FIG. 6, the V2 signal may be phase shifted and multiplied with the $V_{S1}$ signal. The output power may then be the power delivered to load circuit 604. The output power from computation unit 630 may thus be indicative of the power delivered at the point in which a signal is tapped and provided to phase shifter 620.

Series impedance $Z_S$ is the impedance between the input and output of series circuit 602. The magnitude of the series impedance, $|Z_S|$, may be determined in various manners. In one design, $|Z_S|$ may be determined via computer simulation, empirical measurement, or other means. In another design, $|Z_S|$ may be calibrated ahead of time. For example, the sensor output may be measured for a known output power, and $|Z_S|$ may be determined based on the known output power and the measured sensor output. $|Z_S|$ may also be determined in other manners.

A load impedance ($Z_L$) of load circuit 604 may be determined based on a load voltage ($V_L$) at the load circuit and a load current ($I_L$) provided to the load circuit. The load voltage may be determined by measuring the V2 signal. The load current may be determined by measuring the voltage drop across the series impedance and dividing this voltage drop by the series impedance. Load circuit 604 may correspond to a combination of antenna tuning network 274 and antenna 290, and the load impedance may correspond to the impedance looking into antenna tuning network 274. The load impedance may be used to compute various parameters.

The load phase (θ) may be determined as follows:

$$\phi = a\tan\left(\frac{\text{Re}\{Z_L\}}{\text{Im}\{Z_L\}}\right), \qquad \text{Eq (10)}$$

where Re{ } denotes a real part and Im{ } denotes an imaginary part.

A reflection coefficient ρ may be computed based on the load impedance, as follows:

$$\rho = \frac{Z_L - Z_O}{Z_L + Z_O}, \qquad \text{Eq (11)}$$

where $Z_O$ is a characteristics impedance and may be 50 Ohms or some other value.

Voltage standing wave ratio (VSWR) may be computed based on the reflection coefficient, as follows:

$$VSWR = \frac{1+\rho}{1-\rho}. \qquad \text{Eq (12)}$$

VSWR is a ratio of the maximum voltage to the minimum voltage of a signal. VSWR may be used to adjust antenna tuning network 274, to protect PA 234 from excessively large output voltage, and/or for other purposes.

The delivered power $P_{OUT}$, the load impedance $Z_L$, and/or other parameters may be determined based on measurements from detector(s) 280. These parameters may be used to control transmit power and adjust antenna tuning network 274, e.g., as described above for FIG. 5.

Figure 7:
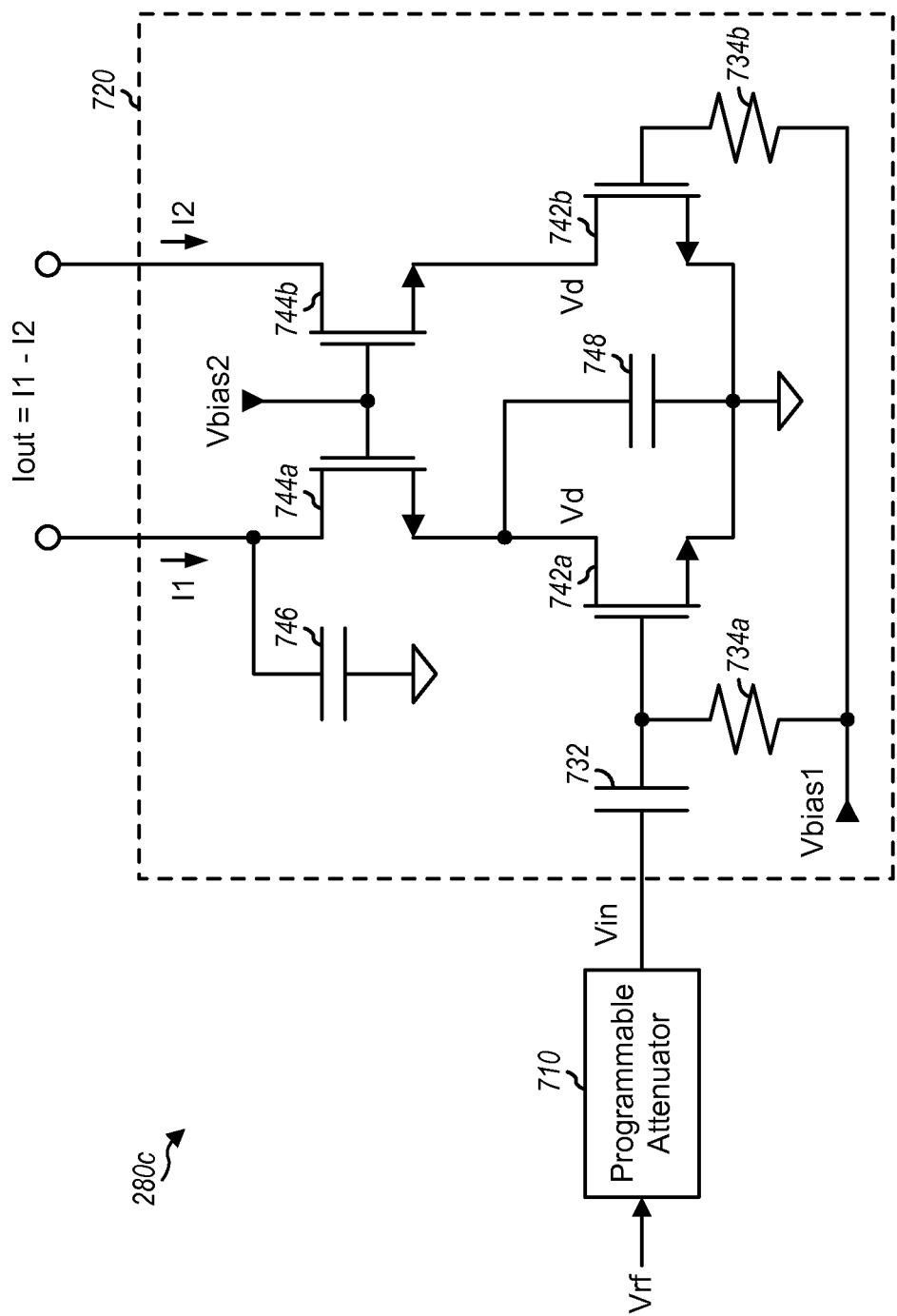

FIG. 7 shows a schematic diagram of a detector 280c, which is yet another exemplary design of detector(s) 280 in FIG. 2. Detector 280c includes a programmable attenuator 710 and a power detector 720. Programmable attenuator 710 receives an RF signal (Vrf) and provides an attenuated RF signal as an input signal (Vin) to power detector 720. The Vrf signal may be any of the RF signals provided to detector(s) 280 in FIG. 2.

In the exemplary design shown in FIG. 7, power detector 720 includes two "gain" N-channel metal oxide semiconductor (NMOS) transistors 742a and 742b coupled as a differential pair. Power detector 720 further includes two "cascode" NMOS transistors 744a and 744b coupled to the two gain NMOS transistors 742a and 742b, respectively. An AC coupling capacitor 732 has one end receiving the Vin signal from programmable attenuator 710 and the other end coupled to the gate of NMOS transistor 742a. NMOS transistors 742a and 742b have their sources coupled to circuit ground and their gates coupled to one end of resistors 734a and 734b, respectively. The other end of resistors 734a and 734b are coupled together and receive a first bias voltage (Vbias1). NMOS transistors 744a and 744b have their gates coupled together, their sources coupled to the drains of NMOS transistors 742a and 742b, respectively, and their drains providing output currents I1 and I2, respectively. A second bias voltage (Vbias2) is provided to the gates of NMOS transistors 742a and 742b. A capacitor 746 is coupled between the drain of NMOS transistor 744a and circuit ground. A capacitor 748 is coupled between the drain of NMOS transistor 742a and circuit ground.

NMOS transistors 744a and 744b provide a differential output current (Iout), which is the difference between the I1 and I2 currents. The Iout current may be approximately proportional to the power of the Vin signal, as follows:

$$I_{out} \approx K_{eff} * V_{in}^2, \qquad \text{Eq (13)}$$

where $K_{eff}$ is an effective gain of power detector 720.

The effective gain $K_{eff}$ may vary with temperature, power supply voltage, and/or other factors. Variations in the effective gain may be reduced by (i) varying the gate-to-source voltage ($V_{GS}$) of NMOS transistors 742a and 742b via the Vbias1 voltage and/or (ii) varying the drain-to-source voltage ($V_{DS}$) of NMOS transistors 742a and 742b via the Vbias2 voltage. The Vbias1 and Vbias2 voltages may be determined for different temperatures and stored in a look-up table. Thereafter, the temperature of power detector 720 may be sensed and applied to the look-up table to obtain the appropriate Vbias1 and Vbias2 voltages for the sensed temperature.

FIG. 7 shows an exemplary design of power detector 720, which may also be used for each of square-law detectors 520a to 520d in FIG. 5. A power detector may also be implemented in other manners.

In another design, detector(s) 280 may include multiple programmable attenuators coupled to multiple power detectors, e.g., as shown in FIG. 5. The multiple programmable attenuators may receive multiple RF signals (e.g., RF signals at multiple ports of directional coupler 270) and may provide multiple attenuated RF signals. The multiple power detectors may measure the transmit powers of the attenuated RF signals. The measured transmit powers of the attenuated RF signals may be used to control the transmit power of wireless device 110 and/or to adjust antenna tuning network 274.

FIGS. 5 to 7 show three exemplary designs of detector(s) 280, which may also be implemented in other manners. Detector(s) 280 may include any number of detectors and any type of detector.

In general, measurements from detector(s) 280 and ADC 282 may be used to determine one or more of the following:
1. Incident power of the transmit RF signal from PA 234, which may be determined based on the input RF signal at port 1 of directional coupler 270,
2. Reflected power from antenna 290, which may be determined based on the reflected RF signal at port 4 of directional coupler 270,
3. Delivered power to antenna 290, which may be determined based on the incident power and the reflected power,
4. VSWR at antenna tuning network 274,
5. Input impedance of a load comprising antenna tuning network 274 and antenna 290,
6. Phase of the load, and/or
7. Other parameters.

In an exemplary design, module 214 within data processor/controller 210 may use the measurements to control the transmit power of wireless device 110, e.g., as shown in FIG. 3. In an exemplary design, module 216 may also use the measurements to adjust antenna tuning network 274 for different radio technologies (e.g., LTE, WCDMA, CDMA 1×, TD-SCDMA, GSM, etc.) in order to obtain good performance for data transmission and reception. Different radio technologies may be associated with different target transmit power levels, different transmit and/or receive timing, etc. Module 216 may have information regarding transmit and receive time intervals (e.g., timeslots) for wireless device 110. Module 214 may control the transmit power of wireless device 110 and/or module 216 may adjust antenna tuning network 274 at appropriate times, for example, (i) at or before transmit and/or receive boundaries, (ii) during certain transmit and/or receive time intervals, and/or (iii) at other appropriate times. Controlling the transmit power of wireless device 110 and/or adjusting antenna tuning network 274 at appropriate times may avoid performance degradation due to switching transients/glitches during transmit and/or receive time intervals of wireless device 110. This may be possible due to availability of information on transmit and receive boundaries and time intervals of wireless device 110, which may be provided by controller 210.

In an exemplary design, module 216 may use the measurements to adjust antenna tuning network 274 for different frequency bands. Antenna 290 may have different impedances at different frequencies. Antenna tuning network 274 may match the impedance of antenna 290 at a selected operating frequency. The performance of wireless device 110 for different possible settings of antenna tuning network 274 for different frequency bands may be determined a priori and stored, e.g., in a look-up table. An appropriate setting of antenna tuning network 274 may be selected based on a specific frequency band on which wireless device 110 operates.

In an exemplary design, module 216 may use the measurements to adjust antenna tuning network 274 for different transmit power levels. The performance of wireless device 110 for different possible settings of antenna tuning network 274 for different transmit power levels may be determined a priori and stored, e.g., in a look-up table. An appropriate setting of antenna tuning network 274 may be selected based on the current transmit power level of wireless device 110.

The circuits within transceiver 220 and front-end module 260 may be implemented in various manners. Some exemplary designs of directional coupler 270 and antenna tuning network 274 are described below.

Figure 8:
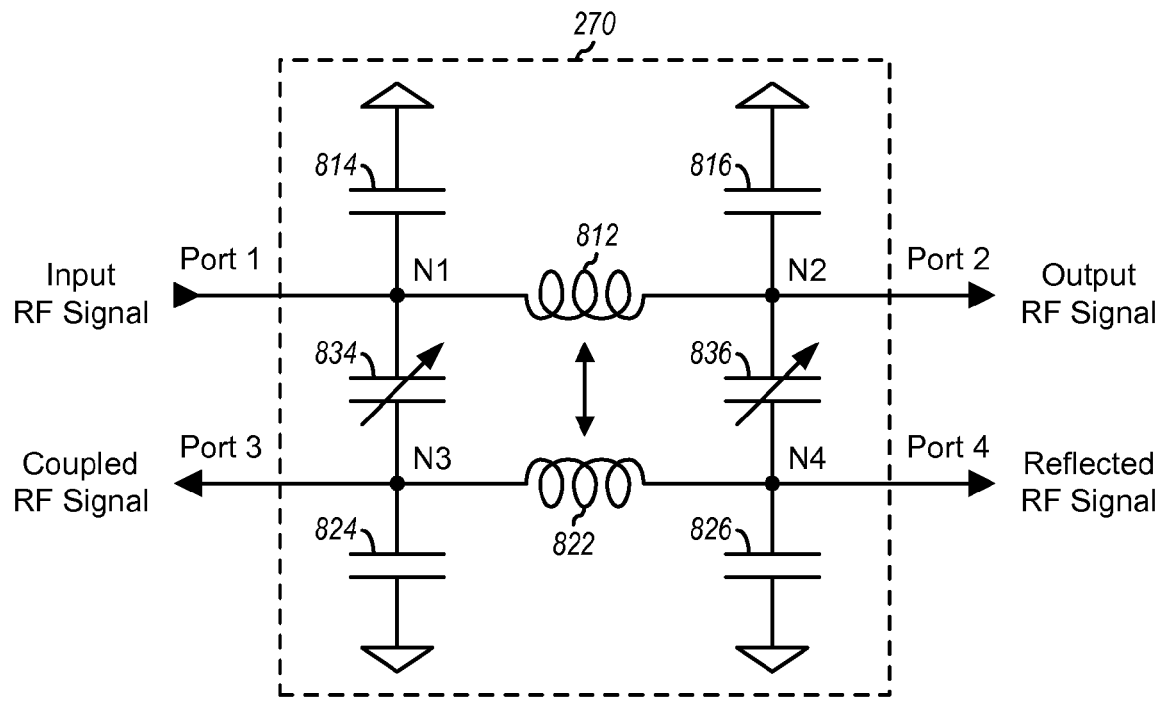
FIG. 8 shows an exemplary design of a directional coupler within the wireless device.

FIG. 8 shows a schematic diagram of an exemplary design of directional coupler 270, which is a 4-port directional coupler. Within directional coupler 270, an inductor 812 is coupled between node N1 and node N2, and an inductor 822 is coupled between node N3 and node N4. Inductor 822 is magnetically coupled with inductor 812, and a portion of an input RF signal passing through inductor 812 is coupled to inductor 822 via the magnetic coupling. A capacitor 814 is coupled between node N1 and circuit ground, and a capacitor 816 is coupled between node N2 and circuit ground. A capacitor 824 is coupled between node N3 and circuit ground, and a capacitor 826 is coupled between node N4 and circuit ground. An adjustable capacitor 834 is coupled between node N1 and node N3, and an adjustable capacitor 836 is coupled between node N2 and node N4. Ports 1, 2, 3 and 4 of directional coupler 270 are coupled to nodes N1, N2, N3 and N4, respectively.

FIG. 8 shows an exemplary design of directional coupler 270 implemented with two inductors 812 and 822 and six capacitors 814, 816, 824, 826, 834 and 836. In an exemplary design, inductors 812 and 822 may have the same inductance of L. Capacitors 814, 816, 824 and 826 may each be a fixed capacitor (as shown in FIG. 8) or an adjustable capacitor (not shown in FIG. 8). Capacitors 834 and 836 may each be an adjustable capacitor (as shown in FIG. 8) or a fixed capacitor (not shown in FIG. 8). Inductors 812 and 822 and capacitors 814, 816, 824, 826, 834 and 836 may have suitable values, which may be selected based on various factors such as a target center frequency of transmitter 230, a frequency range supported by transmitter 230, a target input impedance at port 1 of directional coupler 270, a target output impedance at port 2 of directional coupler 270, etc. Directional coupler 270 may also be implemented with more or fewer capacitors than the six capacitors shown in FIG. 8.

Directional coupler 270 may be designed to provide good performance (e.g., sufficient directivity) for all frequency bands supported by transmitter 230. Directional coupler 270 may be programmable (e.g., via capacitors 834 and 836) and may be set to appropriate values in order to achieve good performance for each supported frequency band.

Directional coupler 270 may be a 4-port directional coupler (as shown in FIGS. 2 and 8) and may be used to detect incident power, output power, coupled power, and/or reflected power. Directional coupler 270 may also be a 3-port directional coupler (not shown in FIG. 2 or 8) and may be used to detect incident power, output power, and coupled power.

For both a 3-port and a 4-port directional coupler, port 3 may be coupled to detector(s) 280 and possibly a feedback receiver (not shown in FIG. 2). Detector(s) 280 may measure the coupled power at port 3, which may be used to control the operation of transmitter 230 and/or wireless device 110. For example, the measured coupled power may be used for power control to adjust the gain of PA 234 to (i) obtain a desired transmit power level for the output RF signal and/or (ii) limit the transmit power level of the output RF signal to within a maximum transmit power level. The feedback receiver may process the coupled RF signal from port 3 to determine signal fidelity of the input RF signal at port 1, e.g., the amount and quality of distortion introduced by transmitter 230 or PA 234. The amount and quality of distortion sensed by the feedback receiver may be used to perform digital pre-distortion to improve linearity of transmitter 230.

For a 4-port directional coupler as shown in FIGS. 2 and 8, ports 3 and 4 of the directional coupler may be coupled to detector(s) 280 and possibly a feedback receiver (not shown in FIG. 2). Detector(s) 280 may measure the coupled power at port 3 and/or the reflected power at port 4, which may be used to determine an amount of signal reflection due to mismatch at antenna 290.

Figure 9A:
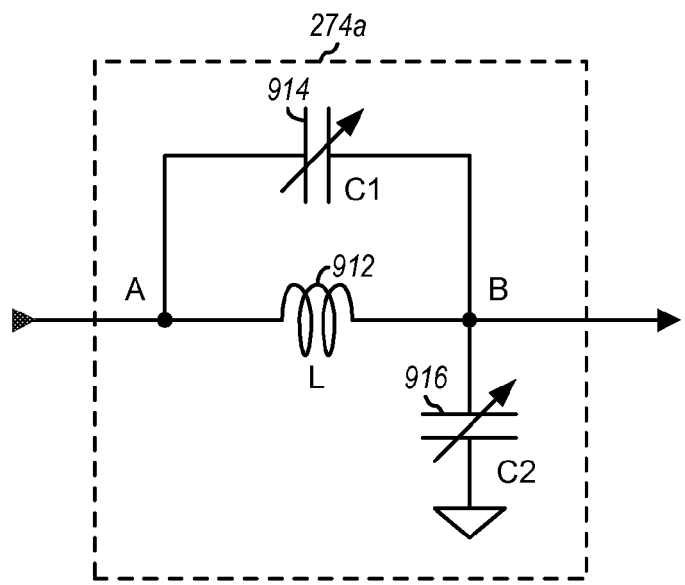
FIGS. 9A and 9F show six exemplary designs of the antenna tuning network.

FIG. 9A shows a schematic diagram of an antenna tuning network 274a, which is one exemplary design of antenna tuning network 274 in FIG. 2. Antenna tuning network 274a includes an inductor 912 and a variable capacitor 914 coupled in parallel and between an input (node A) and an output (node B) of antenna tuning network 274a. A shunt capacitor 916 is coupled between node B and circuit ground. In the exemplary design shown in FIG. 9A, inductor 910 has a fixed inductance of L, and capacitors 912 and 914 have variable capacitances of C1 and C2, respectively. Different impedance and/or power matching settings may be obtained with different combinations of values of C1 and C2.

Figure 9B:
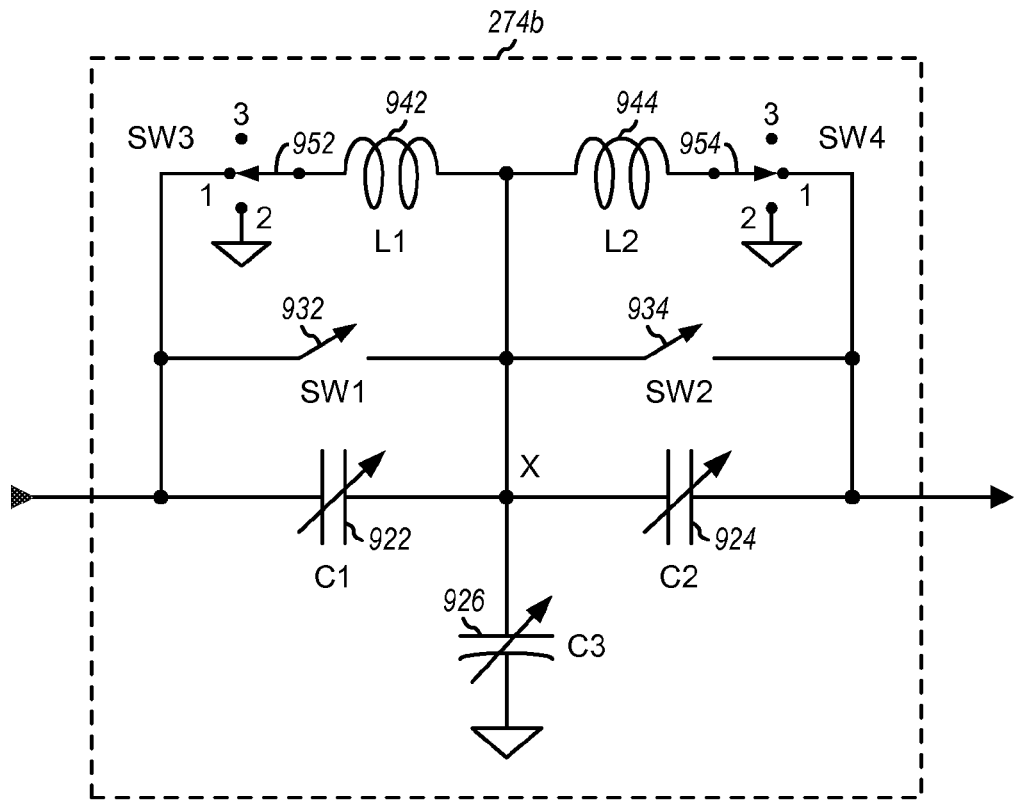

FIG. 9B shows a schematic diagram of an antenna tuning network 274b, which is another exemplary design of antenna tuning network 274 in FIG. 2. Within antenna tuning network 274b, a variable capacitor 922 and a switch 932 are coupled in parallel, and the combination is coupled between an input of antenna tuning network 274b and node X. A variable capacitor 924 and a switch 934 are coupled in parallel, and the combination is coupled between node X and an output of antenna tuning network 274b. A variable capacitor 926 is coupled between node X and circuit ground. An inductor 942 is coupled between node X and an input of a switch 952. Switch 952 has a first output ('1') coupled to the input of antenna tuning network 274b, a second output ('2') coupled to circuit ground, and a floating third output ('3') that is not coupled to any circuit element. An inductor 944 is coupled between node X and an input of a switch 954. Switch 954 has a first output ('1') coupled to the output of antenna tuning network 274b, a second output ('2') coupled to circuit ground, and a floating third output ('3').

Antenna tuning network 274b supports a number of configurations, which may include one or more of the following:
Through/bypass configuration without any inductor (L) or capacitor (C),
Series configuration with series L and/or series C,
Shunt configuration with shunt L and/or shunt C,
"L" configuration with (i) series C and shunt L, (ii) series L and shunt C, (iii) series C and shunt C, or (iv) series L and shunt L,
"R" configuration with (i) shunt C and series L, (ii) shunt L and series C, (iii) shunt C and series C, or (iv) shunt L and series L,
"Pi" configuration with (i) shunt C, series L, and shunt C or (ii) shunt L, series C, and shunt L,
"T" configuration with (i) series C, shunt L, and series C or (ii) series L, shunt C, and series L, and
Other configurations.

Each configuration of antenna tuning network 274b may be associated with (i) a set of states/settings for switches 932, 934, 952 and 954, (ii) a range of load impedances that can be matched by the antenna tuning network, (iii) specific performance characterizations, and/or (iv) other characteristics. A suitable configuration may be selected based on the current operating state of wireless device 110. Suitable values may be select for capacitors 922, 924 and/or 926 to obtain good performance.

Figure 9C:
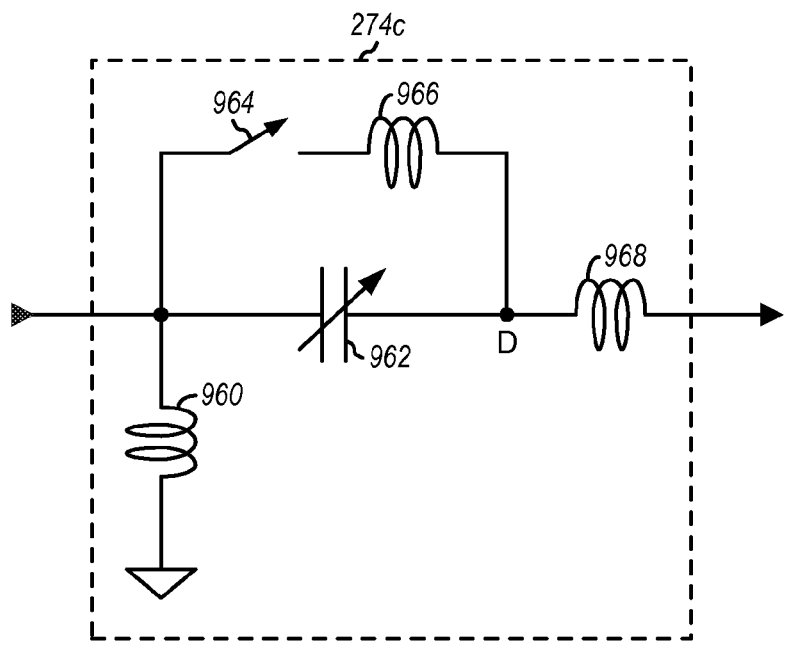

FIG. 9C shows a schematic diagram of an antenna tuning network 274c, which is yet another exemplary design of antenna tuning network 274 in FIG. 2. Within antenna tuning network 274c, an inductor 960 is coupled between the input of network 274c and circuit ground. A variable capacitor 962 is coupled between the input and node D. A switch 964 and an inductor 966 are coupled in series, and the combination is coupled between the input and node D. An inductor 968 is coupled between node D and the output of network 274c.

Figure 9D:
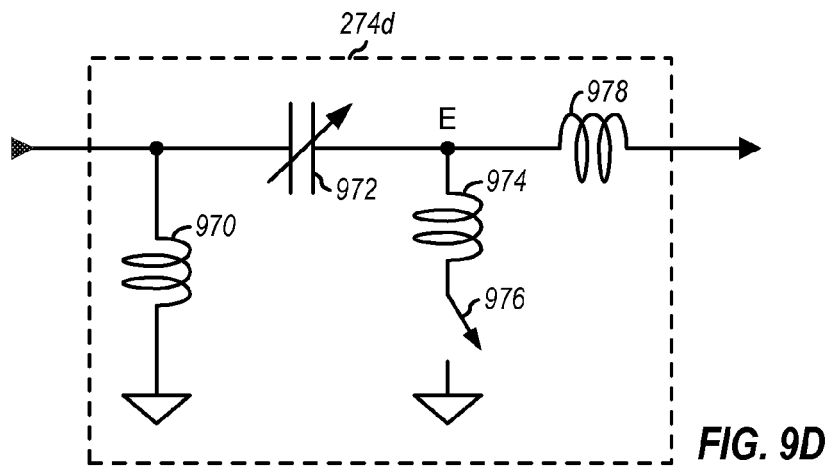

FIG. 9D shows a schematic diagram of an antenna tuning network 274d, which is yet another exemplary design of antenna tuning network 274 in FIG. 2. Within antenna tuning network 274d, an inductor 970 is coupled between the input of network 274d and circuit ground. A variable capacitor 962 is coupled between the input and node E. An inductor 974 and a switch 976 are coupled in series, and the combination is coupled between node E and circuit ground. An inductor 978 is coupled between node E and the output of network 274d.

Figure 9E:
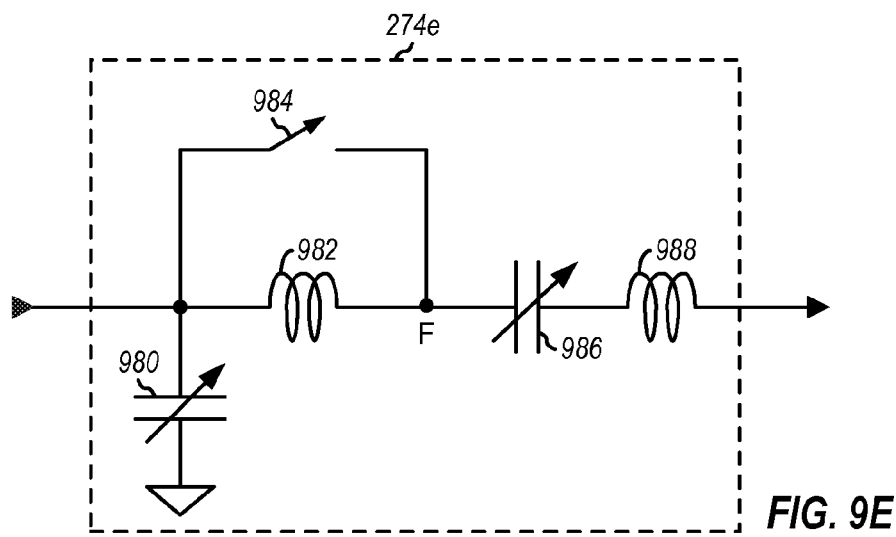

FIG. 9E shows a schematic diagram of an antenna tuning network 274e, which is yet another exemplary design of antenna tuning network 274 in FIG. 2. Within antenna tuning network 274e, a variable capacitor 980 is coupled between the input of network 274e and circuit ground. An inductor 982 and a switch 984 are coupled in parallel, and the combination is coupled between the input and node F. A variable capacitor 986 and an inductor 988 are coupled in series, and the combination is coupled between node F and the output of network 274e.

Figure 9F:
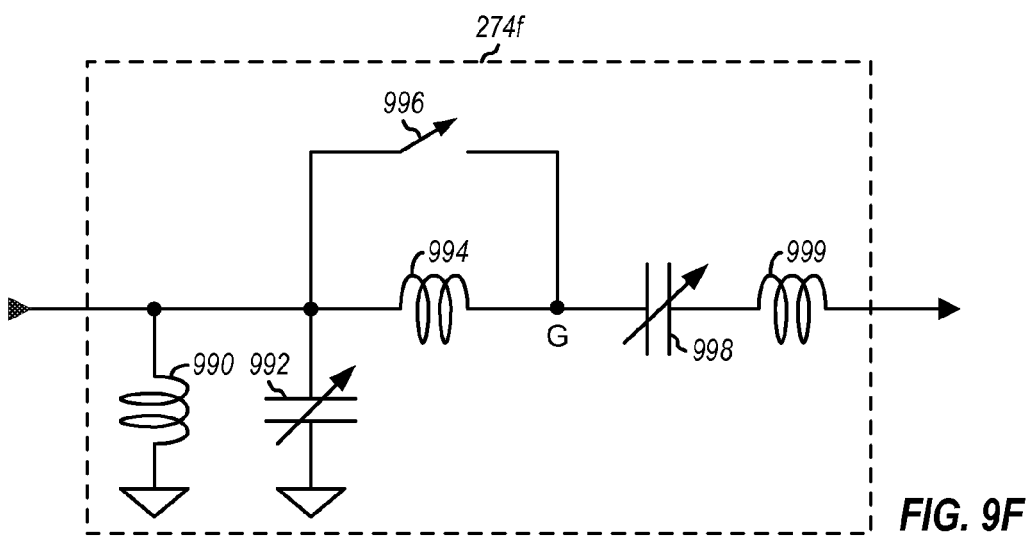

FIG. 9F shows a schematic diagram of an antenna tuning network 274f, which is yet another exemplary design of antenna tuning network 274 in FIG. 2. Within antenna tuning network 274f, an inductor 990 and a variable capacitor 992 are coupled in parallel, and the combination is coupled between the input of network 274f and circuit ground. An inductor 994 and a switch 996 are coupled in parallel, and the combination is coupled between the input and node G. A variable capacitor 998 and an inductor 999 are coupled in series, and the combination is coupled between node G and the output of network 274f.

FIGS. 9A and 9F show six exemplary designs of an antenna tuning network. An antenna tuning network may also be implemented in other manners. For example, an antenna tuning network may include multiple (e.g., two) sections coupled in series. Each section may include inductor 912 and capacitors 914 and 916 coupled as shown in FIG. 9A. Each section may also include one or more inductors and one or more capacitors coupled in other manners.

In an exemplary design, an apparatus (e.g., a wireless device, a circuit module, an IC, etc.) may include a directional coupler and at least one detector. The directional coupler (e.g., directional coupler 270 in FIG. 2) may receive an input RF signal at a first port, provide an output RF signal at a second port, and provide a coupled RF signal at a third port. The directional coupler may also provide a reflected RF signal at a fourth port. The at least one detector (e.g., detector(s) 280 in FIG. 2) may be coupled to the directional coupler and may receive at least one RF signal on at least one port of the directional coupler. The at least one RF signal may include the input RF signal, the output RF signal, the coupled RF signal, the reflected RF signal, or any combination thereof. The detector(s) may measure the at least one RF signal and provide measurements, which may used to control the transmit power of a wireless device and adjust an antenna tuning network on the wireless device.

The at least one detector may comprise at least one of a power detector, a voltage detector, a current detector, or a phase detector. In an exemplary design, the at least one power detector may provide measurements for power level of the at least one RF signal.

In an exemplary design, the apparatus may further include at least one control module, e.g., control module 214 and/or 216 in FIG. 2. The control module(s) may receive the measurements from the at least one detector and generate controls based on the measurements to control the transmit power of the wireless device and adjust the antenna tuning network. In an exemplary design, the control module(s) may determine at least one parameter based on the measurements. The at least one parameter may include incident power, reflected power, delivered power, VSWR, impedance of a load, phase of the load, some other parameter, or a combination thereof. The control module(s) may control the transmit power of the wireless device and/or adjust the antenna tuning network based on the at least one parameter.

In an exemplary design, for transmit power control, the control module(s) may determine a current transmit power of the wireless device based on the measurements. The control module(s) may also determine whether the current transmit power exceeds (i) a maximum transmit power allowed for the wireless device or (ii) a desired transmit power for the wireless device. The control module(s) may (i) limit the transmit power of the wireless device to be within the maximum transmit power or (ii) adjust the transmit power of the wireless device toward the desired transmit power. In an exemplary design, the control module(s) may determine incident power and reflected power based on the measurements, determine delivered power based on the incident power and the reflected power, and control the transmit power of the wireless device based on the delivered power.

In an exemplary design, for antenna tuning network adjustment, the control module(s) may determine a current state of the antenna tuning network, select a new state of the antenna tuning network based on the measurements, and set the antenna tuning network to the new state. In an exemplary design, the control module(s) may determine the delivered power and/or the reflected power based on the measurements and may adjust the antenna tuning network to (i) increase or maximize the delivered power and/or (ii) reduce or minimize the reflected power.

In an exemplary design, the control module(s) may determine transmit timing and/or receive timing of the wireless device and may adjust the antenna tuning network based on the transmit timing and/or receive timing. The control module may adjust the antenna tuning network at or before transmit boundaries and/or receive boundaries of the wireless device in order to mitigate degradation in performance due to adjustment. The transmit and receive boundaries may be given by symbol time, slot time, subframe time, radio frame time.

The apparatus may further include at least one ADC and a control/interface unit. The ADC(s) (e.g., ADC 282 in FIG. 2) may digitize the measurements from the at least one detector and provide measurement values. The control/interface unit (e.g., control/interface unit 284 in FIG. 2) may send the measurement values to the at least one control module. Alternatively, the control/interface unit may directly control the transmit power of the wireless device and/or adjust the antenna tuning network based on the measurement values.

In an exemplary design, the control module(s) may reside within an integrated circuit. The directional coupler and the at least one detector may reside within a front-end module, which may be external to the integrated circuit, e.g., as shown in FIG. 2.

Figure 10:
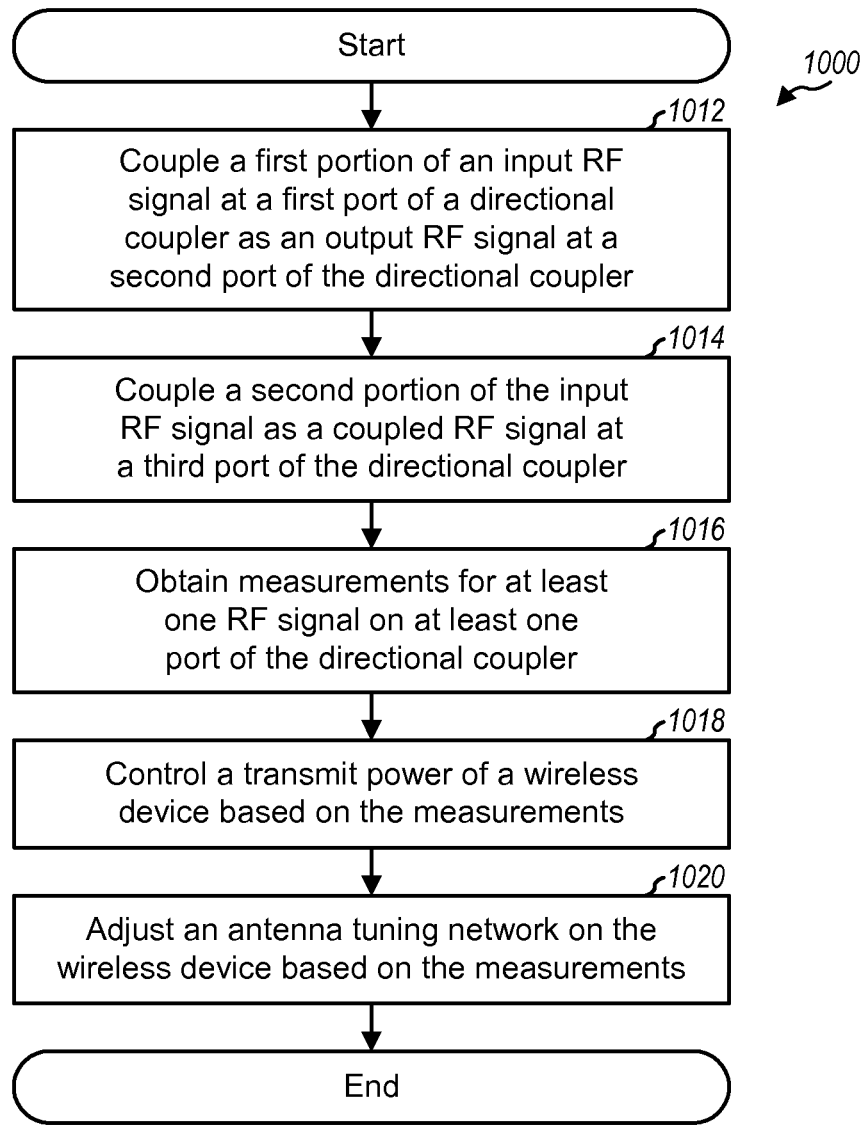
FIG. 10 shows a process for controlling a wireless device.

FIG. 10 shows an exemplary design of a process 1000 for controlling a wireless device. A first portion of an input RF signal at a first port of a directional coupler may be coupled as an output RF signal at a second port of the directional coupler (block 1012). A second portion of the input RF signal may be coupled as a coupled RF signal at a third port of the directional coupler (block 1014). A portion of the output RF signal may be coupled as a reflected RF signal at a fourth port of the directional coupler.

Measurements for at least one RF signal on at least one port of the directional coupler may be obtained (block 1016). A transmit power of a wireless device may be controlled based on the measurements (block 1018). An antenna tuning network on the wireless device may also be adjusted based on the measurements (block 1020).

In an exemplary design of block 1018, a current transmit power of the wireless device may be determined based on the measurements. For example, incident power and reflected power may be determined based on the measurements and used to determined delivered power, which may be indicative of the current transmit power of the wireless device. Whether the current transmit power exceeds a maximum transmit power allowed for the wireless device may be determined.

The transmit power of the wireless device may be limited to be within the maximum transmit power.

In an exemplary design of block 1020, a current state of the antenna tuning network may be determined. A new state of the antenna tuning network may be selected based on the measurements. The antenna tuning network may then be set to the new state. For example, delivered power and/or reflected power may be determined based on the measurements. The antenna tuning network may be adjusted to increase or maximize the delivered power and/or decrease or minimize the reflected power.

The control techniques and circuits described herein may be implemented on one or more ICs, analog ICs, RFICs, mixed-signal ICs, application specific integrated circuits (ASICs), printed circuit boards (PCBs), electronic devices, etc. The circuits may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the control techniques and/or circuits described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   a directional coupler configured to receive an input radio frequency (RF) signal at a first port, provide an output RF signal at a second port, provide a coupled RF signal at a third port;
   at least one detector coupled to the directional coupler and configured to receive at least one RF signal on at least one port of the directional coupler, measure the at least one RF signal, and provide measurements based on the at least one RF signal received from the directional coupler and used to control within a transceiver a transmit power of a wireless device and adjust an antenna tuning network on the wireless device; and
   at least one control module configured to:
      receive the measurements from the at least one detector;
      generate controls based on the measurements to control the transmit power of the wireless device and adjust the antenna tuning network;
      determine a current transmit power of the wireless device based on the measurements;
      determine whether the current transmit power exceeds a maximum transmit power allowed for the wireless device; and
      limit the transmit power of the wireless device to be within the maximum transmit power.

2. An apparatus comprising:
   a directional coupler configured to receive an input radio frequency (RF) signal at a first port, provide an output RF signal at a second port, provide a coupled RF signal at a third port;
   at least one detector coupled to the directional coupler and configured to receive at least one RF signal on at least one port of the directional coupler, measure the at least one RF signal, and provide measurements based on the at least one RF signal received from the directional coupler and used to control within a transceiver a transmit power of a wireless device and adjust an antenna tuning network on the wireless device; and
   at least one control module configured to:
      receive the measurements from the at least one detector;
      generate controls based on the measurements to control the transmit power of the wireless device and adjust the antenna tuning network;
   determine incident power and reflected power based on the measurements;
   determine delivered power based on the incident power and the reflected power; and
   control the transmit power of the wireless device based on the delivered power.

3. The apparatus of claim 1 or 2, the at least one control module is further configured to:
   determine a current state of the antenna tuning network;
   select a new state of the antenna tuning network based on the measurements; and
   set the antenna tuning network to the new state.

4. The apparatus of claim 1 or 2, wherein the detector comprises at least one power detector configured to provide measurements for power level of the at least one RF signal and wherein the at least one control module is further configured to:

determine delivered power, or reflected power, or both based on the measurements; and adjust the antenna tuning network to increase the delivered power, or reduce the reflected power, or both.

5. The apparatus of claim 1, the directional coupler is further configured to provide a reflected RF signal at a fourth port, and the at least one RF signal comprising at least one of the input RF signal, the output RF signal, the coupled RF signal, and the reflected RF signal.

6. The apparatus of claim 1 or 2, the at least one control module is further configured to adjust the antenna tuning network based on transmit timing, or receive timing, or both of the wireless device.

7. An apparatus comprising:
a directional coupler configured to receive an input radio frequency (RF) signal at a first port, provide an output RF signal at a second port, provide a coupled RF signal at a third port;
at least one detector coupled to the directional coupler and configured to receive at least one RF signal on at least one port of the directional coupler, measure the at least one RF signal, and provide measurements based on the at least one RF signal received from the directional coupler and used to control within a transceiver a transmit power of a wireless device and adjust an antenna tuning network on the wireless device; and
at least one control module configured to:
receive the measurements from the at least one detector;
generate controls based on the measurements to control the transmit power of the wireless device and adjust the antenna tuning network; and
adjust the antenna tuning network at or before transmit boundaries, or receive boundaries, or both of the wireless device.

8. The apparatus of claim 1, 2, or 7, wherein the apparatus is a mobile device comprising an integrated circuit and a front-end module external to the integrated circuit, wherein the at least one control module comprises circuitry included in the integrated circuit, and the directional coupler and the at least one detector comprise circuitry included in the front-end module external to the integrated circuit.

9. An apparatus comprising:
means for coupling a first portion of an input radio frequency (RF) signal as an output RF signal and coupling a second portion of the input RF signal as a coupled RF signal;
means for obtaining measurements for at least one RF signal on at least one port of the means for coupling;
means for controlling within a transceiver a transmit power of a wireless device based on the measurements determined via the at least one RF signal received from the directional coupler, the means for controlling the transmit power comprising:
means for determining a current transmit power of the wireless device based on the measurements;
means for determining whether the current transmit power exceeds a maximum transmit power allowed for the wireless device; and
means for limiting the transmit power of the wireless device to be within the maximum transmit power; and
means for adjusting an antenna tuning network on the wireless device based on the measurements.

10. The apparatus of claim 9, the means for adjusting the antenna tuning network comprising:
means for determining a current state of the antenna tuning network;
means for selecting a new state of the antenna tuning network based on the measurements; and
means for setting the antenna tuning network to the new state.

11. The apparatus of claim 9, the means for adjusting the antenna tuning network comprising a means for adjusting the antenna tuning network at or before transmit boundaries, or receive boundaries, or both of the wireless device.

* * * * *